United States Patent [19]

Johansson et al.

[11] 4,117,754
[45] Oct. 3, 1978

[54] TRANSVERSE CUTTER

[75] Inventors: Jan-Olof Johansson, Höganäs; Heikki Korpela, Helsingborg; Karel Spacek, Mörarp, all of Sweden

[73] Assignee: Gullfiber AB, Billesholm, Sweden

[21] Appl. No.: 755,019

[22] Filed: Dec. 28, 1976

[30] Foreign Application Priority Data

Dec. 29, 1975 [SE] Sweden .............................. 7514724

[51] Int. Cl.² ........................ B23D 25/04; B26D 1/56
[52] U.S. Cl. ...................................... 83/307.2; 83/318; 83/578
[58] Field of Search ...................... 83/318, 319, 307.1, 83/307.2, 327, 328, 320, 578

[56] References Cited

U.S. PATENT DOCUMENTS

| 1,164,846 | 12/1915 | Nelson | 83/307.2 X |
| 2,641,042 | 6/1953 | Kopp | 83/307.2 X |
| 3,129,624 | 4/1964 | Auer | 83/319 X |
| 3,566,728 | 3/1971 | Ohmasu | 83/319 X |
| 3,717,058 | 2/1973 | Meminn | 83/320 X |
| 3,822,623 | 7/1974 | Wight | 83/307.1 X |

Primary Examiner—Willie G. Abercrombie
Attorney, Agent, or Firm—Birch, Stewart, Kolasch & Birch

[57] ABSTRACT

An apparatus for cutting a cellular plastic web emerging from a web forming machine into a plurality of predetermined lengths is described. A cutting device including a plurality of spaced filaments is provided on a movable carriage slidably supported on a support stand. The filaments extend transversely of the carriage and the direction of the web emerging from the forming machine. The carriage is mounted on the stand for reciprocating sliding movement and in one direction of traverse moves in synchronism and in the same direction as the web. The filaments move alternately toward and away from the carriage to cut the web during successive synchronized movements of the carriage and web.

2 Claims, 2 Drawing Figures

TRANSVERSE CUTTER

BACKGROUND OF THE INVENTION

1. Field of the Invention

The present invention is concerned with a means for transverse cutting of a web of cellular plastic fed continuously out of a forming machine, which means includes a stand-mounted reciprocating carriage moving in synchronism with the web in one direction of traverse and at the same time dividing the web into separate lengths by means of cutting devices.

2. Description of Prior Art

The cellular plastic web consists of porous plastic formed by sintering granules or grains expanded with a blowing agent. Forming machines of the type used for forming in this instance are known. For example, Swedish Pat. No. 171,095 discloses a machine of this type. With continuously operating cellular plastic forming machines it has been the practice for many years to use so-called flying crosscuts equipped with saw blades to cut the continuously moving web into the required lengths. The cellular plastic forming machines first used, which had a comparatively low production rate of aproximately 6m per minute, interacted with cross-cuts based on the principle of a transverse saw blade which was mounted on and moved with a reciprocating carriage to cut the cellular plastic web as the carriage traveled in one direction, and then returned to its starting point.

However, with the further development of cellular plastic forming machines to achieve a production rate approaching 16 to 17m per minute with a web width of 1.0m, the problems of meeting length tolerances with the flying crosscuts increased.

The latest generation of cellular plastic forming machines are capable of a web feed rate of approximately 27m per minute. This has meant an equivalent increase in the demands made on the flying crosscut, but despite very extensive development work the previously used conventional flying crosscut has unfortunately proved unable to meet these increased demands. This is easily understood if we consider that the cutter is required to work under difficult conditions. Given a web traverse of 27m per minute, a cutting length of 1.0m, a web width of 1.25m and a length tolerance of ± 2mm, the crosscut has to carry out 27 cuts per minute, including return to a fixed starting point after each cut, direct acceleration from 0 to 27m per minute by the supporting carriage for each cutting operation, and a transverse motion by the saw blade across the 1.25m wide web in a time of not more than 0.8 seconds, starting from a stationary condition.

Under these conditions it has proved both in theory and in practice impossible to do the work using earlier known cutting means.

SUMMARY OF THE INVENTION

The purpose of the invention, in view of the above, is to achieve a transverse cutting means which is capable of working as intended under the initially given conditions. This is made possible by cutting devices consisting of mutually spaced filaments extending transversely across the carriage and capable of simultaneous motion perpendicular to the plane of the carriage. It is further advantageous for the filaments to be arranged so as to cut alternately towards and away from the plane of the carriage during successive synchronized traverses by the carriage in the direction of the web motion. When cutting the web into lengths of approximately 1m it has proved especially satisfactory to use three or more filaments, which then move parallel to each other in the manner described above.

BRIEF DESCRIPTION OF THE DRAWINGS

The invention is described in more detail below in the form of an embodiment presented as an example and with reference to the accompanying drawing, wherein.

DETAILED DESCRIPTION OF PREFERRED EMBODIMENTS

Figure 1:
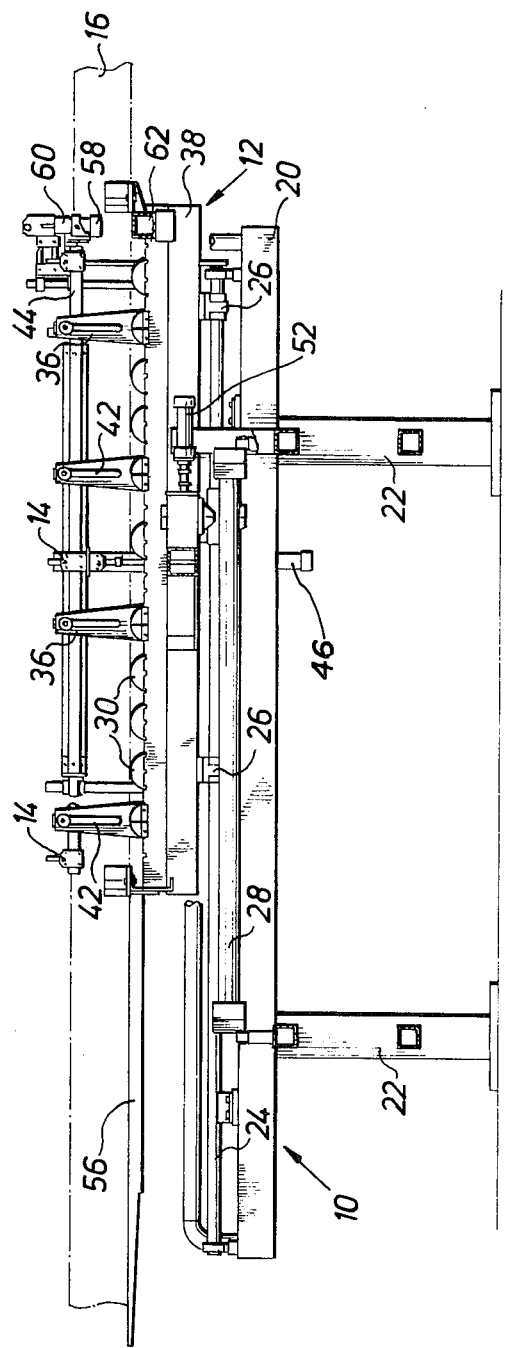
FIG. 1 shows a side elevation of a cutter mounted on a stand and designed in accordance with the principles of the invention, to be used in combination with a cellular plastic forming machine, certain details being cut away to better illustrate the individual components of the cutter.
Figure 2:
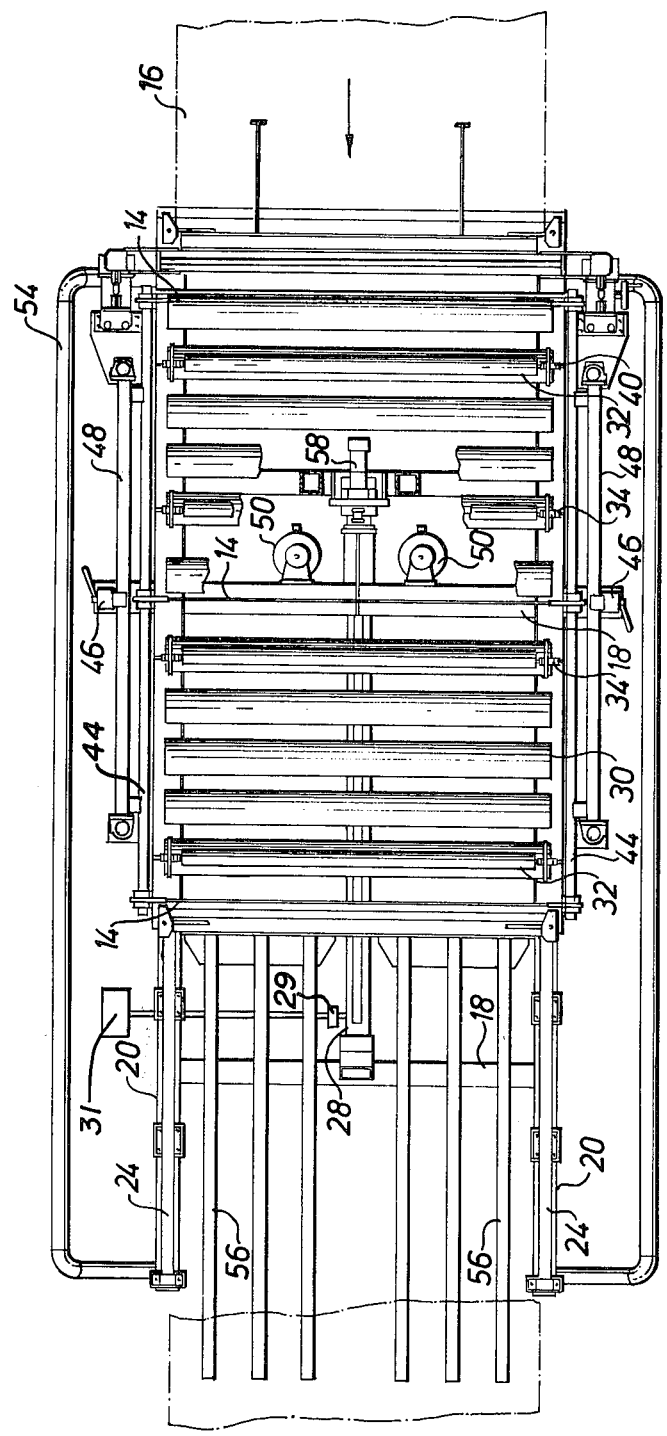
FIG. 2 is a top plan view of the cutter illustrated in FIG. 1.

The cutter illustrated in the drawing includes a reciprocating carriage 12 mounted on a stand 10, the carriage being equipped with three cutting devices 14 in the form of mutually spaced filaments stretched transversely across the carriage 12 and capable of moving parallel to each other and perpendicular to the plane of the carriage. The cellular plastic forming machine is not shown but is imagined as being located to the right of the cutter, and the cellular plastic web 16 therefore moves from right to left in the figures.

The stand 10 comprises a supporting frame constructed of transverse and longitudinal beams, 18 and 20 respectively, supported on four legs 22.

The carriage 12 is mounted to slide on two separate guide shafts 24 attached to the frame, and the drawings show two sliding mountings 26 attached to the underside of the carriage 12 and each gripping one of the guide shafts 24 to allow sliding motion by the carriage 12 with respect to the shafts. The carriage 12 is driven by a driving cylinder 28 which is coupled directly to the underside of the carriage. The part of the carriage 12 designed to support the cellular plastic web 16 comprises a number of parallel supporting rollers 30 located transversely across the carriage 12. In addition, a number of pressure rollers 32 press upon the top side of the web 16, their height above the supporting rollers 30 being adjustable depending on the thickness of the web 16. For this purpose the ends of the pressure rollers 32 can be fixed by means of locking devices 34 in relation to brackets 36 projecting up from the sides of the base 38 of the carriage 12. Journals 40 at the ends of the rollers pass through elongated vertical slots 42 in the brackets.

The three cutting filaments 14, which have an electric supply (not shown in detail), extend transversely across the carriage 12 with their ends connected to busbars 44 located along the side edges of the carriage 12 and parallel to its direction of traverse. It is an advantage if the position of the ends of the filaments 14 can be altered relative to the busbars 44 to obtain the desired spacing between the filaments 14. The illustrated embodiment has two cylinders 46, one attached approximately at the middle of each of the supporting bars 48 to enable vertical movement of the busbars 44 connected thereto and hence at the same time of the filaments 14. The compressed-air driven cylinders 46 and the supporting bars 48 are naturally well insulated electrically from the busbars 44. The cylinders 46 are also oil stabilized and supplied with fluid from two separate tanks 50. Using an arrangement of this type the filaments 14 can be kept in motion throughout the cutting operation at a constant speed suited to the density of the cellular plastic web 16.

A damping cylinder 52 is provided to damp the deceleration of the carriage 12 on its return (towards the right of the drawing), to prevent excessively abrupt stopping which might damage the equipment.

The cellular plastic web 16 is fed onto the carriage 12 via driving belts from the cellular plastic forming machine and fed off the carriage 12, after cutting, onto slide bars 56. Forward movement of the web cuttings on the slide bars 56 is brought about by the pressure from the cuttings behind.

To supply the starting pulse for the filament cutter, a measuring wheel (not shown) in contact with the continuously moving cellular plastic web 16 can be arranged to generate in a manner known per se via an electronic length measuring instrument a signal which activates an electromagnetic valve. The length measuring instrument can be preset to the desired triggering length.

A holding device 60, actuated by a compressed-air driven cylinder 58, is arranged so as to clamp the web 16 against an underlying counterpart 62 located on the carriage 12 upon a starting pulse being received. The starting pulse also causes acceleration of the carriage 12 and immediately the web 16 is clamped by the holding device 60. During this acceleration the cylinder 28 of the carriage 12 is subjected to more or less full air pressure. Upon attainment of the desired final speed, matching the speed of the web 16, the cylinder 28 is fed via a time-controlled switch valve 29 connected to an air pressure supply 31 to feed the cylinder 28 at a controlled pressure corresponding to the continued traverse of the carriage 12. This arrangement achieves a perfect balance between the carriage 12 and the continuously moving cellular plastic web 16. Without this coordination, the clamping of the web 16 between the holding device 60 and the underlying counterpart 62 can cause the web 16 to be stretched, torn off, or slowed down. Slowing or stretching of the web 16 can cause tolerance errors in the length of the web cuttings.

When carriage 12 traverse is initiated, the filaments 14 also start their vertical motion. In this course of this motion, which takes place alternately upwards and downwards, the filaments 14 cut completely through the web 16. When cutting with the three filaments 14 illustrated, two web cuttings of length exactly 1 meter and one cutting of nominal length 1 meter are obtained. The length tolerance obtained for the last-mentioned cutting is closely bound up with the time adjustment of the holding device 60 and the carriage acceleration.

After the filaments 14 have cut the web 16 into the desired lengths, a sensor (not shown) is activated, and after a preset time lag, which can be altered depending on the density of the web, the carriage 12 returns to its starting position, its motion being damped by the damping cylinder 52 mentioned above. The time lag is to allow the filaments 14 to cut completely through the web 16 and to be stretched before the return of the carriage 12.

The next cutting cycle of the filaments takes place in a manner analogous to that described above, with the difference that this time the filaments 14 move in the opposite direction with respect to the plane of the carriage as they cut through the web 16.

It should be understood that the transverse cutting machine of the present invention may be modified as would occur to one of ordinary skill in the art without departing from the spirit and scope of the present invention.

What is claimed is:

1. An apparatus for transverse cutting of a web of cellular plastic fed continuously out of a forming machine comprising:
   a support stand;
   a carriage means mounted for reciprocating motion on said support stand;
   a plurality of cutting devices comprising mutually spaced hot filaments reciprocably mounted on and extending transversely across said carriage means;
   means for moving said carriage means in successive synchronized traverses with said web and simultaneously moving said plurality of cutting devices perpendicular to the plane of said carriage; and
   said means for moving said carriage means in successive synchronized traverses with said web moves said plurality of cutting devices towards said carriage means from above said web and alternately moves said plurality of cutting devices away from said carriage means from below said web during successive synchronized traverses of said carriage means in the direction of motion of said web to divide said web transversely into separate lengths by means of said cutting devices.

2. The apparatus according to claim 1 wherein said cutting means includes at least three filaments disposed for parallel movement with respect to each other.

* * * * *